United States Patent [19]

Morishita et al.

[11] Patent Number: 4,828,595

[45] Date of Patent: May 9, 1989

[54] PROCESS FOR THE PRODUCTION OF GLASS

[75] Inventors: Hiroshi Morishita; Terukazu Imayoshi; Hitoshi Kikuchi, all of Kanagawa; Akihiro Nakamura, Tokyo, all of Japan

[73] Assignee: Japan Oxygen Co., Ltd., Japan

[21] Appl. No.: 126,103

[22] PCT Filed: Feb. 27, 1987

[86] PCT No.: PCT/JP87/00125

§ 371 Date: Oct. 27, 1987

§ 102(e) Date: Oct. 27, 1987

[87] PCT Pub. No.: WO87/05286

PCT Pub. Date: Sep. 11, 1987

[30] Foreign Application Priority Data

Feb. 28, 1986 [JP] Japan .................................. 61-43800

[51] Int. Cl.$^4$ ...................... C03C 10/00; C03B 19/02
[52] U.S. Cl. ...................... 65/18.4; 65/33; 65/66; 65/134; 65/136; 65/DIG. 8
[58] Field of Search ............... 65/18.1, 18.4, 22, 66, 65/30.1 L, 33, 134, 136, DIG. 8

[56] References Cited

U.S. PATENT DOCUMENTS

| | | | |
|---|---|---|---|
| 805,139 | 11/1905 | Hitchcock | 65/136 |
| 1,549,597 | 8/1925 | Miller | 65/66 |
| 1,645,080 | 10/1927 | Watson | 65/136 X |
| 2,726,487 | 12/1955 | Cummins et al. | 65/DIG. 8 |
| 3,883,337 | 5/1975 | Helgesson et al. | 65/31 |
| 3,927,697 | 12/1975 | Baumler et al. | 65/DIG. 8 |
| 4,013,436 | 3/1977 | Van der Steen | 65/136 X |
| 4,042,361 | 8/1977 | Bihuniak et al. | 65/18 |
| 4,093,771 | 6/1978 | Goldstein | 428/312 |
| 4,146,379 | 3/1979 | Copley et al. | 65/18 |
| 4,225,330 | 9/1980 | Kakuzen et al. | 65/18 |
| 4,414,282 | 11/1983 | McCollister et al. | 65/32 X |
| 4,416,680 | 11/1983 | Bruning et al. | 65/144 |
| 4,429,009 | 1/1984 | Pastor et al. | 65/33 X |
| 4,465,656 | 8/1984 | Pastor et al. | 423/339 |

FOREIGN PATENT DOCUMENTS

| | | |
|---|---|---|
| 54-24919 | 2/1979 | Japan . |
| 54-36951 | 3/1979 | Japan . |
| 54-36742 | 3/1979 | Japan . |
| 54-74818 | 6/1979 | Japan . |
| 61-58822 | 3/1986 | Japan . |
| 61-58823 | 3/1986 | Japan . |
| 61-58824 | 3/1986 | Japan . |
| 61-58832 | 3/1986 | Japan . |
| 62-30633 | 2/1987 | Japan . |
| 62-30634 | 2/1987 | Japan . |

OTHER PUBLICATIONS

*Vacuum,* The International Journal and Abstracting Service for Vacuum Science and Technology, vol. 13, Pergamon Press, 1963, pp. ii, 47–52.

Boganov et al, "Threshold of Light Breakdown in Hydroxyl-Free High-Purity Vitreous Silica", *Soviet Journal of Glass Physics and Chemistry,* vol. 6, No. 5, Sep.-/Oct. 1980, pp. 383–390 (English language translation by Plenum Publishing Corporation).

Rabinovich et al, "Preparation of High-Silica Glasses from Colloidal Gels: I, Preparation for Sintering and Properties of Sintered Glasses", *Journal of the American Ceramic Society,* vol. 66, No. 10, Oct. 1983, pp. 683–688.

Kingery et al, *Introduction to Ceramics,* Second Edition, John Wiley & Sons, Inc., 1976, pp. 274–275.

*Primary Examiner*—Robert L. Lindsay
*Attorney, Agent, or Firm*—Lowe, Price, LeBlanc, Becker & Shur

[57] ABSTRACT

The present invention relates to a process for production of a glass by the vacuum melting method using silica as raw material and comprises uniformly preheating a silica powder containing an accelerator for phase conversion to about 800° C.; filling the preheated silica powder in a container while substantially maintaining the temperature; further heating the silica powder to convert it into a sintered body having a cristobalite phase; and then heating and melting the sintered body in vacuum for glass formation, whereby not only are improvments in raw material efficiency and productivity by shortening of the heating time achieved, but also the formation of cracks on the surface of the resulted sintered body which has been one of the important reasons for resulting in products of sub-standard can be substantially completely avoided.

3 Claims, No Drawings

PROCESS FOR THE PRODUCTION OF GLASS

TECHNICAL FIELD

The present invention relates to a process for the production of a glass by a vacuum melting method using silica as a raw material.

BACKGROUND TECHNOLOGY

In general, glasses as industrial products are produced by heating raw material powders prepared in a prescribed mixing proportion in a crucible or a tank furnace at temperatures higher than the liquids temperature to form a homogeneous mixture in the melted state and then cooling the mixture. In the production of a glass, the glass is usually made transparent, for example, by a means in which the bubbles in the melt formed from the adsorbed gas in the raw materials and the gas generated during the reaction are removed by elevating the temperature of the melt to reduce its viscosity sufficiently thereby allowing the gases and bubbles to float to its surface.

However, in the case of producing a glass from silica as the raw material, because of its high melting point, the temperature cannot be elevated to an extent effective for removing bubbles because of restrictions such as the high viscosity of the melt, refractoriness required for the crucible or furnace and for other reasons. If the temperature is elevated excessively, gases are generated by the volatilization of the raw material per se and the reaction between the raw material and the crucible forms all the more bubbles. Therefore, the above-described method cannot be employed. For the reasons set forth above, a method for the production of a transparent quartz glass using silica as the raw material is restricted to any one of the following methods:

(1) A method in which a silica powder is gradually fed into an argon-oxygen plasma flame or an oxygen-hydrogen flame and melted for glass formation and the resulting melt is deposited onto a stand. The generated gases are dissipated from the surface (Verneuil method);

(2) A method in which a porous body composed of silica fine particles is prepared and melted from one end thereof in the band-like state for glass formation. The generated gases leave from the unmelted porous body (zone melting method); and (3) A method in which rock crystal powders prepared to have particle diameter of about 100 μm are placed in a crucible and melted in a vacuum furnace for glass formation. The generated gases are removed by force (vacuum melting method).

However, with respect to the method (1) and method (2), it is well known that an extremely long period of time is required for producing one glass block and productivity is poor, and especially in the case of the Verneuil method, the yield is as low as 30% to 40%. Further, in the case that the argon-oxygen plasma flame is employed as a heat source, though a glass having a small number of residual OH groups and a relatively small number of bubbles can be obtained, the energy cost is high, whereas in the case that the oxygen-hydrogen flame which is low in the energy cost is employed, the problem is that the product has a large number of residual-OH groups. Still further, since the shape of ingots which can be produced is restricted to cylindrical and slender shapes, there is a disadvantage to the subsequent processings.

According to the vacuum melting method (3), though a relatively large-sized ingot having a small number of residual OH groups and a high viscosity at high temperatures can be obtained, since the raw material powder filled in a vessel such as a crucible is melted for glass formation, not only is there a difficulty in degassing but also a reaction gas caused by the contact with the vessel is generated, and the resulting glass has a relatively large number of bubbles. Therefore, glass having a high quality cannot be obtained. Further, since the rock crystal powders are used, bubbles tend to be generated due to low purity of the raw material per se. Also, there is a concern in the raw material supply due to exhaustion of the resources.

Under such a background, the present inventors have developed a process by which a transparent or functional, high-quality glass can be readily produced at a low production cost. This process is characterized in that a silica powder is filled in a suitable vessel, heated in the presence of an accelerator for phase conversion such as an alkali metal component etc. to form a porous body having continuous open pores unified in a crystal phase right below the melting point, and then melted in vacuo for glass formation (see Japanese Patent Application Nos. 181586/84, 181587/84, 181588/84, 170663/85, and 170664/85).

It is known that crystalline silica causes phase conversion from a quartz phase in low-temperature to a tridymite phase and further to a cristobalite phase, depending upon the heating temperature in the heating step. This phase conversion hardly takes place when silica is used alone, but $Li_2O$, $Na_2O$, $K_2O$, MgO, CaO, $P_2O_5$, and $B_2O_3$ are known to be useful as an accelerator for phase conversion. Since amorphous silica is sintered for glass formation without being crystallized when used alone, in order to crystalize it into a cristobalite phase, the addition of the above-described metal additives is required. Accordingly, in the process of the present invention, the above-described metal component is used in the step for crystallizing the silica powder into the cristobalite phase. However, as will be understood from the foregoing explanation concerning the prior art technologies, in the conventional production methods of glasses, if such a metal component is present in the raw material, such metal component, if any, is likely to cause deterioration in purity of a final product as in the case of OH groups or the like and this is not desirable. That is, in the conventional production methods of glasses, there is a conflicting relation between obtaining a high-quality quartz glass and adding impurities to the raw material or employing a raw material containing impurities.

In view of the foregoing fact, it can be said that the process of the present invention in which an accelerator for phase conversion is added to silica or silica containing an effective component for the phase conversion is selectively used as the raw material is a method not available with the conventional concept. The reasons why this process can readily obtain a high-quality glass as compared with the conventional methods is that the characteristics available with a sintered body consisting of a cristobalite phase produce improved effects when coupled with employment of the vacuum melting method. In other words, as is well known, since the melting point of the sintered body is uniquely determined by the cristobalite phase, the sintered body can be heated up to the temperature right below the melting point and subjected to the degassing processing. Further, since the sintered body consisting of a cristobalite phase is a porous body having continuous open pores, it can be degassed thoroughly and readily. Accordingly, if a metal component, such as Na, which is readily decomposed and vaporized at temperatures below the melting point of the sintered body, is employed as an accelerator for phase conversion, a transparent quartz glass from which the impurities (including the accelerator for phase conversion) have almost completely been removed can be obtained. On the other hand, if an accelerator which is not decomposed and removed at said melting point is selected, functional glass containing only the accelerator but free from other impurites can be obtained.

As described above, the process according to the present invention which is for the production of a glass by the vacuum melting method is different from the conventional methods in that it employs a crystallization step in which a silica powder as the raw material is converted to a sintered body having a cristobalite phase by an accelerator for phase conversion. In order to obtain a sintered body in a crystallization step, a heating time required was usually 40 hours or more. As compared with other conventional methods, the method is not low in productivity and it has an advantage in that a relatively large-sized high-quality ingot can be obtained, but a further reduction in production cost has been desired from the standpoint of demands for such type of glass.

An object of the present invention is not only to accelerate the advantage of the method of the production of a glass with which the present invention is concerned but also to improve the productivity.

DISCLOSURE OF THE INVENTION

In order to solve the above-described problems, the characteristic of the present invention comprises uniformly preheating a silica powder containing an accelerator for phase conversion to about 800° C.; filling the preheated silica powder in a container while substantially maintaining this temperature; further heating the silica powder to convert it into a sintered body having a cristobalite phase; and then heating and melting the sintered body in vacuum for glass formation.

The process for the production of a glass according to the present invention can not only solve poor yield in raw materials and poor productivity requiring extremely long operation time in glass formation, which have been unable to be avoided in the Verneuil method or other conventional methods, but also can produce the glass at an inexpensive cost, owing to disuse of a particularly expensive heat source. These effects can further be accelerated in the process of the present invention. That is, in the case where a sintered body is obtained by the process of the present invention, not only can the heating time, which has hitherto required about 40 hours or more, be shortened by about a half to thereby extremely improve the productivity, but also the formation of cracks on the surface of the sintered body, which has been one of the main causes of inferior products can be substantially completely avoided.

BEST MODE TO PRACTICE THE INVENTION

As described above, the process for the production of a glass according to the present invention is characterized in that the raw material powder is converted into a crystallized sintered body without direct glass formation. The crystallization is generally carried out by filling a mullite container with a silica powder having added thereto an accelerator for phase conversion such as Na etc. for example, and heating it in a furnace. In this case, the sintered body is required to be unified into a cristobalite phase right below the melting point. The heating to be made is one wherein the heating to 1,100° C. is carried out for about 40 hours, followed by keeping at 1,100° C. for about 4 hours.

A sintered body is required to be readily degassed during the glass formation while it is required to have a suitable rigidity for improving productivity at the same time. In order to obtain a high-quality glass, it is also desired that no cracks are formed on the surface of the sintered body. This is because if a sintered body containing cracks is subjected to the glass formation, the cracks grow further in the vacuum melting, whereby a good-quality glass cannot be obtained. It has already been experimentally known that the heating should be performed at an extremely slow rate and the temperature should be maintained just before the start of the sintering for a certain period of time, and if such measures are taken, the cracks are hardly formed. Accordingly, as described above, the heating for about 46 hours was required.

The present inventors have made various investigations on the method in which a crack-free sintered body can be obtained with ease within a short period of time and found that the formation of cracks on the surface of a sintered body is caused by the temperature difference between the surface and the core portion of the powder body, at the start of sintering. That is, the larger the temperature difference between the surface and the core portion of the powder body the more readily formation of cracks occurs. Accordingly, the above-mentioned effect obtainable from keeping the powder body for a predetermined period of time just before the start of the sintering is based on this finding. Further, it has also been found that the heating which is performed until just before the start of the sintering is merely the matter of obtaining the temperature required and that the necessity of extremely slow heating rate comes from the fact that it is difficult to perform uniform heating because the raw material powder is filled in a container for heating. Since the raw material powder to be used is as small in bulk density as 0.3 [g/cm$^3$] and the thermal conductivity thereof is as low as 0.3 [kcal/mH°C], it is further difficult to achieve such uniform heating.

In the present invention based on these findings, a silica powder containing an amount of an accelerator effective for phase conversion such as an Na component is uniformly heated up to about 800° C. wherein, though any heating means is applicable, it is effective to perform the heating while stirring to achieve uniform heating and productivity. After the raw material powder is heated up to about 800° C. by this preheating, the powder is filled in a mullite container or vessel having a desired shape while maintaining said temperature, and then is heated up to 1,100° C. or higher to convert it to a sintered body having a cristobalite phase. Thereafter, the resultant sintered body is transferred into a vacuum furnace while maintaining the temperature at 500° C. or higher and heated and melted for glass formation in vacuum of 0.5 mb or less at 1,750° C. or higher.

POSSIBILITY OF USE IN INDUSTRY

The present invention can be used as a process for the production for a glass which is used in a tool for apparatus of producing semiconductors, instruments for physics and chemistry, optical materials, and the like.

We claim:

1. A process for the production of a glass, characterized in that silica powder containing an accelerator for phase conversion is uniformly preheated up to a temperature of about 800° C., said preheated silica powder is filled in a container while substantially maintaining said temperature, further heating said silica powder to convert it into a sintered body having cristobalite phase, and heating and melting said sintered body in vacuum for glass formation.

2. A process for production of a glass as claimed in claim 1, characterized in that the preheating of the silica powder is carried out by heating the silica powder while stirring.

3. A process for production of a glass as claimed in claim 1, characterized in that in said further heating, the temperature of the sintered body is maintained for a predetermined period of time just before the start of sintering.

* * * * *